US012324031B2

(12) United States Patent
Lu et al.

(10) Patent No.: US 12,324,031 B2
(45) Date of Patent: *Jun. 3, 2025

(54) TECHNIQUES TO REDUCE TIME TO MUSIC FOR A PLAYBACK DEVICE

(71) Applicant: Sonos, Inc., Santa Barbara, CA (US)

(72) Inventors: Cheng Lu, Malden, MA (US); Stuart Eichert, Mountain View, CA (US)

(73) Assignee: Sonos, Inc., Goleta, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/615,882

(22) Filed: Mar. 25, 2024

(65) Prior Publication Data

US 2024/0311079 A1 Sep. 19, 2024

Related U.S. Application Data

(63) Continuation of application No. 17/461,856, filed on Aug. 30, 2021, now Pat. No. 11,943,823.

(Continued)

(51) Int. Cl.
*G06F 3/16* (2006.01)
*H04L 61/5007* (2022.01)
(Continued)

(52) U.S. Cl.
CPC ............ *H04W 76/10* (2018.02); *G06F 3/162* (2013.01); *G06F 3/165* (2013.01);
(Continued)

(58) Field of Classification Search
CPC .. H04W 76/10; H04W 48/16; H04L 61/5007; G06F 3/162; G06F 3/165; H04R 1/1025; H04R 1/1041

(Continued)

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Christopher M Crutchfield
*Assistant Examiner* — Jean F Voltaire

(57) ABSTRACT

An example playback device is configured to detect an input indicating a command to power up the playback device and, based on the input, begin initialization of a wireless network interface. After beginning initialization of the wireless network interface but before the playback device is capable of establishing a connection to at least one wireless network type via the wireless network interface, the playback device causes the wireless network interface to scan for available wireless networks of the at least one wireless network type. The playback device identifies at least one available wireless network and stores an indication of the at least one available wireless network. After the playback device is capable of establishing a connection, the playback device uses the stored indication of the at least one available wireless network to establish a connection to a given wireless network of the at least one available wireless network.

20 Claims, 12 Drawing Sheets

Related U.S. Application Data

(60) Provisional application No. 63/072,748, filed on Aug. 31, 2020.

(51) Int. Cl.
| | |
|---|---|
| *H04R 1/10* | (2006.01) |
| *H04W 48/16* | (2009.01) |
| *H04W 76/10* | (2018.01) |
| *H04W 84/18* | (2009.01) |

(52) U.S. Cl.
CPC ....... *H04L 61/5007* (2022.05); *H04R 1/1025* (2013.01); *H04R 1/1041* (2013.01); *H04W 48/16* (2013.01); *H04R 2420/07* (2013.01); *H04W 84/18* (2013.01)

(58) Field of Classification Search
USPC .......................................................... 455/413
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,137,559 | B2 * | 9/2015 | Sofos ............... H04N 21/44227 |
| 10,686,858 | B1 * | 6/2020 | Gandhi ............ H04N 21/25808 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2012/0157032 | A1 * | 6/2012 | Goodman ............. H04W 76/50 455/404.1 |
| 2016/0088036 | A1 * | 3/2016 | Corbin ................. H04L 67/306 709/219 |
| 2016/0241907 | A1 * | 8/2016 | Pearson ............... H04L 12/2805 |
| 2017/0236512 | A1 * | 8/2017 | Williams ................ G10L 13/02 381/79 |
| 2018/0047394 | A1 * | 2/2018 | Tian ........................ G10L 15/24 |
| 2019/0098674 | A1 * | 3/2019 | Pallen ................... H04W 4/023 |
| 2021/0297168 | A1 * | 9/2021 | van Erven ................ G01S 5/18 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Notice of Allowance mailed on Oct. 24, 2023, issued in connection with U.S. Appl. No. 17/461,856, filed Aug. 30, 2021, 11 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

TECHNIQUES TO REDUCE TIME TO MUSIC FOR A PLAYBACK DEVICE

CROSS-REFERENCE TO RELATED APPLICATIONS

This application claims priority under 35 U.S.C. § 120 to, and is a continuation of, U.S. patent application Ser. No. 17/461,856, filed Aug. 30, 2021, which claims priority under 35 U.S.C. § 119 to U.S. Provisional Patent App. No. 63/072,748, filed on Aug. 31, 2020, which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
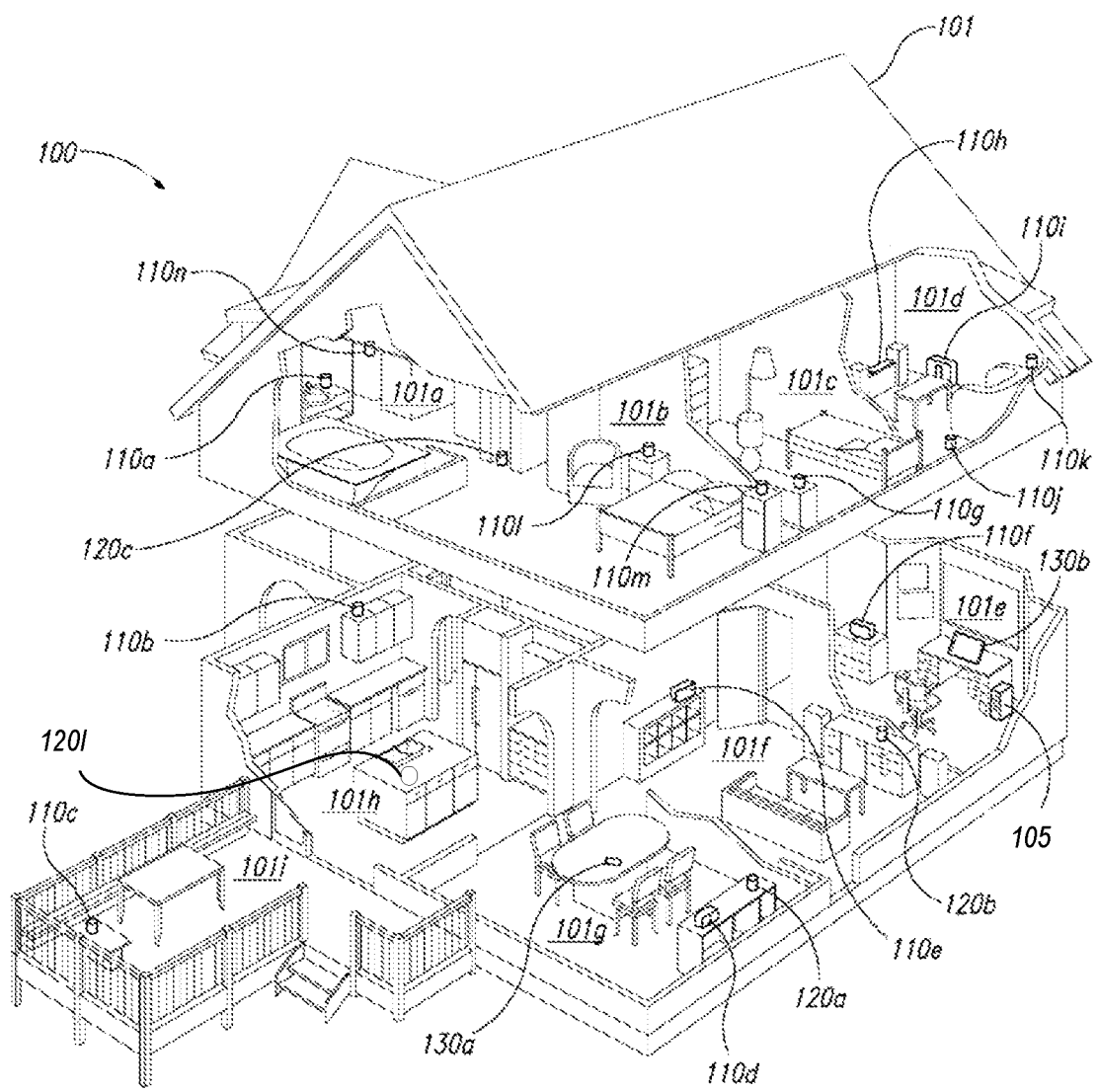
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to techniques for reducing time-to-music (TTM), which can be an important consideration for playback devices that directly impacts a user's experience. At a high level, TTM refers to the time it takes for a playback device to start playing back audio content from a given state. For many types of stationary playback devices that are always plugged into an electrical outlet (e.g., always powered), the starting point for measuring TTM is typically an idle or sleep state where the playback device is already booted and is executing one or more software applications used for the retrieval and playback of audio content over a wireless network connection (e.g., from a media streaming service). Accordingly, for a stationary playback device of this kind, the TTM may be relatively short, perhaps no more than a few seconds, when starting from a powered-on, idle state. This is generally within the expectations of a typical user. Indeed, achieving a relatively short TTM is one of the primary motivations for maintaining full power to many of the electronic components in a stationary playback device (e.g., processor(s), wireless network interface(s), memory, etc.), even though it may result in a corresponding increase in power consumption.

As another illustrative example, if the starting point for a stationary playback device of this kind were a completely powered-off state (e.g., unplugged from the electrical outlet, or plugged in with completely powered-off internal components), the TTM would be substantially longer. For instance, upon receiving a command to power up (e.g., by plugging in the device), the stationary playback device may need to proceed through a number of operations before it can begin playing audio content. These operations may include (i) initializing its wireless network interface, which may include installing and/or loading one or more drivers, (ii) performing a scan for available wireless networks (e.g., WIFI networks and/or BLUETOOTH networks), (iii) identifying one or more available wireless networks and then connecting to an identified network, (iv) obtaining an IP address on the identified network (e.g., for a WIFI network), and (v) initializing one or more software applications that facilitate receiving and executing commands for the retrieval and playback of audio content over the identified wireless network. Conventionally, a playback device carries out these operations sequentially one-at-a-time, and thus TTM can be upwards of 30 seconds or even greater than one minute in these situations. However, these timeframes are generally viewed as acceptable to most users, who do not expect a stationary playback device to be ready to play back audio content over a wireless network connection immediately upon plugging it in to an outlet. Moreover, it is a scenario that a user will face relatively rarely, if ever, after initial setup of a stationary playback device.

Portable playback devices, on the other hand, present additional challenges because they may rely on an internal power supply (e.g., a battery) for extended periods of time. Power conservation for such devices is a greater concern, and thus leaving the playback device in an always-powered state when idle is a less desirable solution. Consequently, a portable playback device's idle state may be a state in which some or all internal components (e.g., processor(s), wireless network interface(s), memory, etc.) are completely powered off. In this regard, a portable playback device that is "woken up" from this state may need to complete some or all of the same operations discussed above before it is able to play back audio content. Nonetheless, users generally have a higher expectation that portable playback devices will be capable of playing back audio content relatively quickly after the user wakes up the portable playback device from an idle state, by pressing a button on the device, for example. Thus, a relatively lengthy TTM of 30 seconds or more for a portable playback device may negatively impact a user's experience. As portable playback devices continue to increase in popularity, and as user expectations of consumer device performance continues to increase, improvements may be needed.

To address these and other issues, techniques are discussed below that may allow for some of the initialization operations discussed herein to be performed in parallel. For example, it may be possible for a playback device, upon initial startup from a powered-off state, to begin scanning for available wireless networks while the playback device's wireless network interface is still being initialized, and thus before the wireless network interface is actually capable of establishing a wireless connection. In conventional playback devices, a network scan generally does not begin until the wireless network interface is fully initialized (e.g., the drivers are fully loaded). Thus, performing these operations simultaneously may shorten or even eliminate the time needed to perform a network scan after the wireless network interface drivers are fully loaded, thereby reducing a portable playback device's TTM.

As another example, a portable playback device that is started from a powered-off state will generally need to initialize the software application that coordinates the retrieval and playback of audio content via the device's wireless network interface. In many cases, because the software application may enable the communication and coordination with various devices over a wireless network, such as a user's home WIFI network, the software application may assume the presence of an IP address for the playback device. Consequently, initialization of the software application may not be able to proceed before an IP address is obtained. However, it may be possible for the playback device to perform some initialization operations for the software application that do not require an IP address, while other initialization operations for the software application that do require an IP address are deferred. Thus, various operations that would normally be executed after obtaining an IP address are already completed, and the playback device need only execute the deferred operations. As above, this may further reduce a portable playback device's TTM.

As discussed further in the examples below, two or more of the techniques discussed herein may also be combined, such that a portable playback device may perform multiple parallel operations related to initializing its wireless network interface, scanning for available networks, and initializing a software application for coordinating audio content playback, among other possibilities.

In some embodiments, for example, a playback device is provided including at least one processor, a wireless network interface, a non-transitory computer-readable medium, and program instructions stored on the non-transitory computer-readable medium that are executable by the at least one processor such that the playback device is configured to (i) detect an input indicating a command to power up the playback device, (ii) based on the detected input, begin initialization of the wireless network interface, (iii) after beginning initialization of the wireless network interface but before the playback device is capable of establishing a connection to at least one wireless network type via the wireless network interface, cause the wireless network interface to scan for available wireless networks of the at least one wireless network type, (iv) identify, via the wireless network interface, at least one available wireless network of the at least one wireless network type, (v) store an indication of the at least one available wireless network, and (vi) after the playback device is capable of establishing a connection to the at least one type of wireless network via the wireless network interface, use the stored indication of the at least one available wireless network to establish a connection to a given wireless network of the at least one available wireless network.

In another aspect, a non-transitory computer-readable medium in provided. The non-transitory computer-readable medium is provisioned with program instructions that, when executed by at least one processor, cause a playback device to (i) detect an input indicating a command to power up the playback device, (ii) based on the detected input, begin initialization of the wireless network interface, (iii) after beginning initialization of the wireless network interface but before the playback device is capable of establishing a connection to at least one wireless network type via the wireless network interface, cause the wireless network interface to scan for available wireless networks of the at least one wireless network type, (iv) identify, via the wireless network interface, at least one available wireless network of the at least one wireless network type, (v) store an indication of the at least one available wireless network, and (vi) after the playback device is capable of establishing a connection to the at least one type of wireless network via the wireless network interface, use the stored indication of the at least one available wireless network to establish a connection to a given wireless network of the at least one available wireless network.

In yet another aspect, a method carried out by a playback device includes, (i) detecting an input indicating a command to power up the playback device, (ii) based on the detected input, beginning initialization of a wireless network interface, (iii) after beginning initialization of the wireless network interface but before the playback device is capable of establishing a connection to at least one wireless network type via the wireless network interface, causing the wireless network interface to scan for available wireless networks of the at least one wireless network type, (iv) identifying, via the wireless network interface, at least one available wireless network of the at least one wireless network type, (v) storing an indication of the at least one available wireless network, and (vi) after the playback device is capable of establishing a connection to the at least one type of wireless network via the wireless network interface, using the stored indication of the at least one available wireless network to establish a connection to a given wireless network of the at least one available wireless network.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

II. Suitable Operating Environment a. Suitable Media Playback System

Figure 1B:
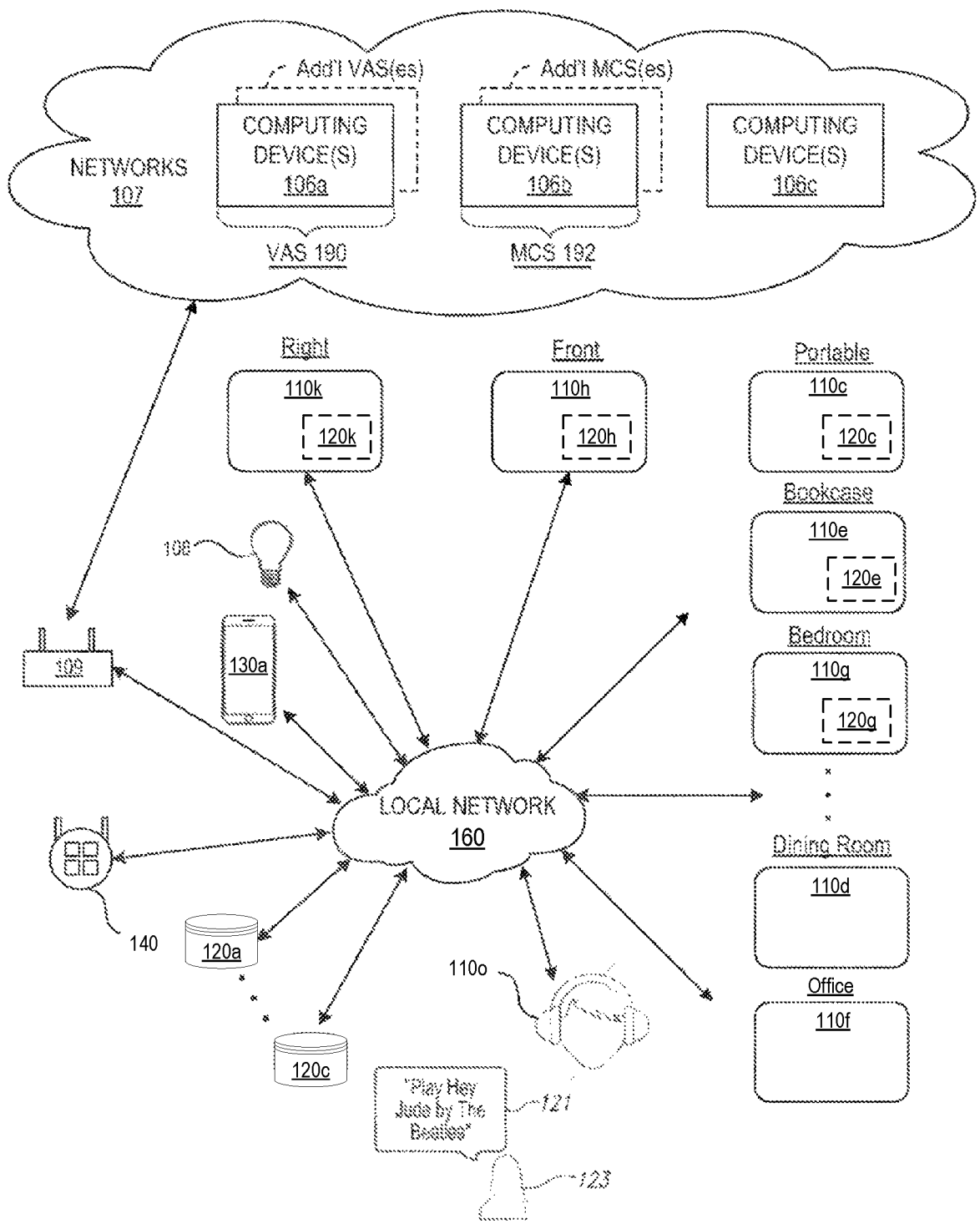
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces. The MPS 100 comprises one or more playback devices 110 (identified individually as playback devices 110a-o), one or more network microphone devices ("NMDs") 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 100a) in synchrony with a second playback device (e.g., the playback device 100b). Interactions between the playback devices 110, NMDs 120, and/or control devices 130 of the MPS 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108 (FIG. 1B), a smart thermostat 140, and a local computing device 105 (FIG. 1A). In embodiments described below, one or more of the various playback devices 110 may be configured as portable playback devices, while others may be configured as stationary playback devices. For example, the headphones 110*o* (FIG. 1B) are a portable playback device, while the playback device 110*e* on the bookcase may be a stationary device. As another example, the playback device 110*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a local network 160 that may include a network router 109. For example, the playback device 110*j* in the Den 101*d* (FIG. 1A), which may be designated as the "Left" device, may have a point-to-point connection with the playback device 110*k*, which is also in the Den 101*d* and may be designated as the "Right" device. In a related embodiment, the Left playback device 110*j* may communicate with other network devices, such as the playback device 110*h*, which may be designated as the "Front" device, via a point-to-point connection and/or other connections via the local network 160.

The local network 160 may be, for example, a network that interconnects one or more devices within a limited area (e.g., a residence, an office building, a car, an individual's workspace, etc.). The local network 160 may include, for example, one or more local area networks (LANs) such as a wireless local area network (WLAN) (e.g., a WIFI network, a Z-Wave network, etc.) and/or one or more personal area networks (PANs) (e.g. a BLUETOOTH network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.12, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHz, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106*a* are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes.

In some embodiments, the various playback devices 110, NMDs 120, and/or control devices 130 may transmits data associated with a received voice input to a VAS configured to (i) process the received voice input data and (ii) transmit a corresponding command to the MPS 100. In some aspects, for example, the computing devices 106*a* may comprise one or more modules and/or servers of a VAS. In some implementations, VASes may be operated by one or more of SONOS®, AMAZON®, GOOGLE® APPLE®, MICROSOFT®, NUANCE®, or other voice assistant providers. In some implementations, MCSes may be operated by one or more of SPOTIFY, PANDORA, AMAZON MUSIC, GOOGLE PLAY, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other household devices. In other embodiments, however, the local network 160 comprises an existing household communication network (e.g., a household WIFI network). In some embodiments, the MPS 100 is implemented without the local network 160, and the various devices comprising the MPS 100 can communicate with each other, for example, via one or more direct connections, PANs, telecommunication networks (e.g., an LTE network or a 5G network, etc.), and/or other suitable communication links.

In some embodiments, audio content sources may be regularly added or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 110 may take the form of or include an on-board (e.g., integrated) network microphone device configured to receive voice utterances from a user. For example, the playback devices 110c-110h, and 110k include or are otherwise equipped with corresponding NMDs 120c-120h, and 120k, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 120l may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110e because it is physically situated on a bookcase. Similarly, the NMD 120l may be assigned the named "Island" because it is physically situated on an island countertop in the Kitchen 101h (FIG. 1A). Some playback devices may be assigned names according to a zone or room, such as the playback devices 110g, 110d, and 110f, which are named "Bedroom," "Dining Room," and "Office," respectively. Further, certain playback devices may have functionally descriptive names. For example, the playback devices 110k and 110h are assigned the names "Right" and "Front," respectively, because these two devices are configured to provide specific audio channels during media playback in the zone of the Den 101d (FIG. 1A). The playback device 110c in the Patio may be named "Portable" because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. Patent Publication No. 2017-0242653 published Aug. 24, 2017, and titled "Voice Control of a Media Playback System," which is herein incorporated by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the NIPS 100 or indirectly via the VAS 190. In some implementations, the VAS 190 may transmit to the NIPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110e in the environment 101 (FIG. 1A) is in relatively close proximity to the NMD-equipped Living Room playback device 120b, and both devices 110e and 120b may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 120l in the Kitchen 101h (FIG. 1A) may be assigned to the Dining Room playback device 110d, which is in relatively close proximity to the Island NMD 120l. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106a-d. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

Figure 1C:
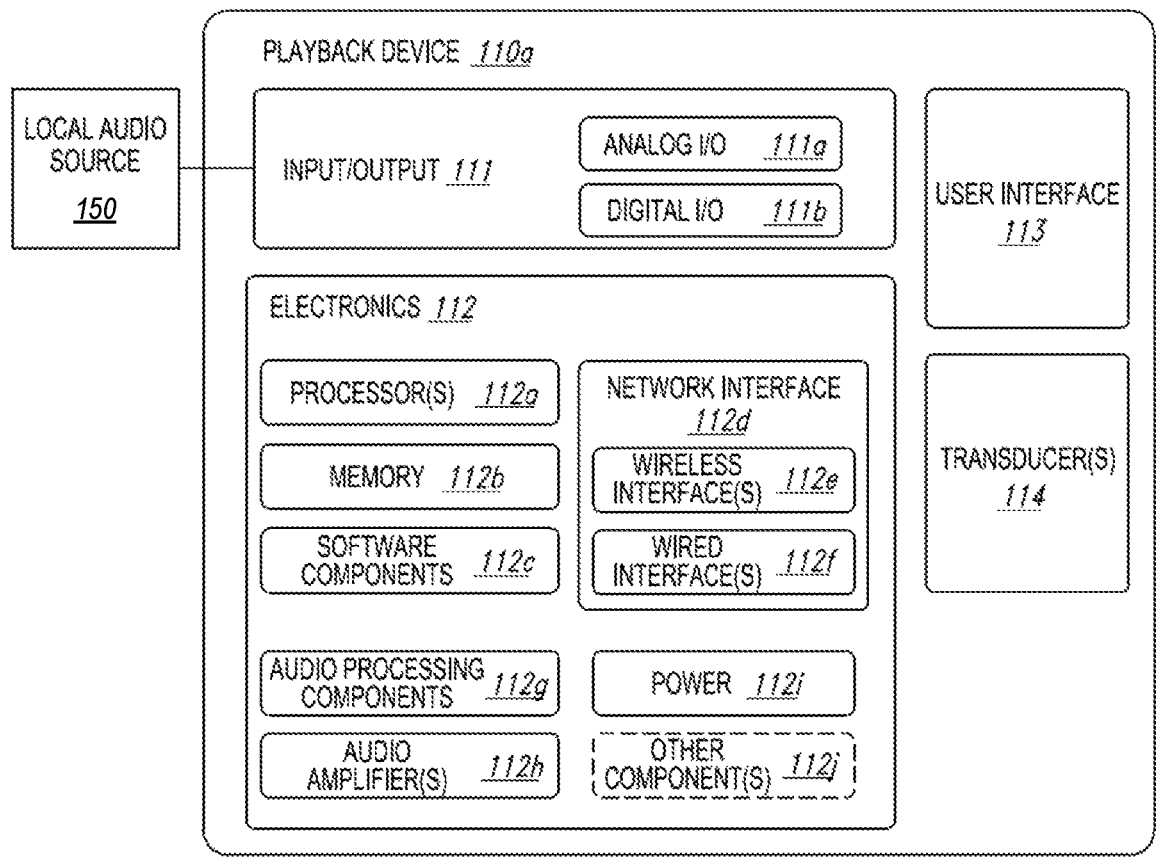
FIG. 1C is a block diagram of an example playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WIFI, BLUETOOTH, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 150 via the input/output 111 (e.g., a cable, a wire, a PAN, a BLUETOOTH connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110a does not include an input/output 111 and receives all audio content via the local network 160.

The playback device 110a further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106a-c via the local network 160 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g, one or more audio amplifiers 112h (referred to hereinafter as "the amplifiers 112h"), and power components 112i (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112j (e.g., one or more sensors, video displays, touchscreens, battery charging bases). In some embodiments, the playback device 110a and electronics 112 may further include one or more voice processing components that are operable coupled to one or more microphones, and other components as described below with reference to FIGS. 1F and 1G.

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112*d* is configured to facilitate a transmission of data between the playback device 110*a* and one or more other devices on a data network. The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., WIFI, BLUETOOTH, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio processing components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

In some implementations, the power components 112*i* of the playback device 110*a* may additionally include an internal power source (e.g., one or more batteries) configured to power the playback device 110*a* without a physical connection to an external power source. When equipped with the internal power source, the playback device 110*a* may operate independent of an external power source. In some such implementations, an external power source interface may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more of lights (e.g., LEDs) and the speakers to provide visual and/or audio feedback to a user.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110*a* may include a speaker interface for connecting the playback device to external speakers. In other embodiments, the playback device 110*a* may include an audio interface for connecting the playback device to an external audio amplifier or audio-visual receiver.

Figure 1D:
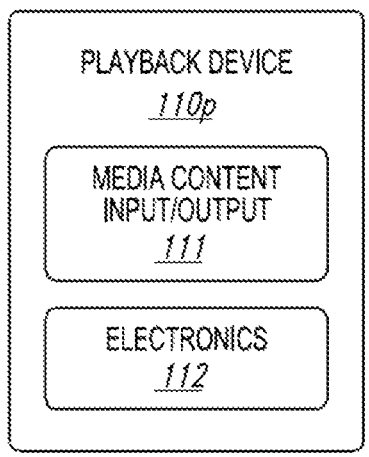
FIG. 1D is a block diagram of an example playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skill in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
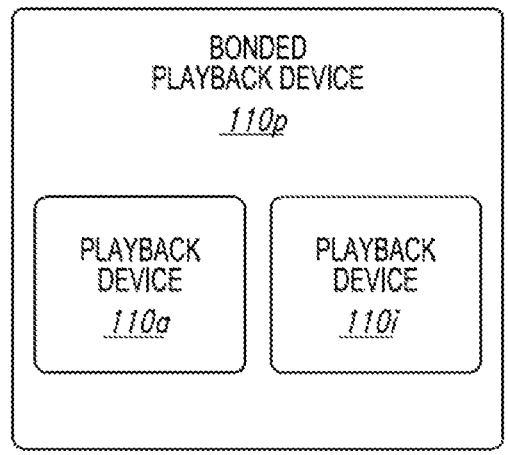
FIG. 1E is a block diagram of an example playback device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with playback device 110*i*, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

Figure 4:
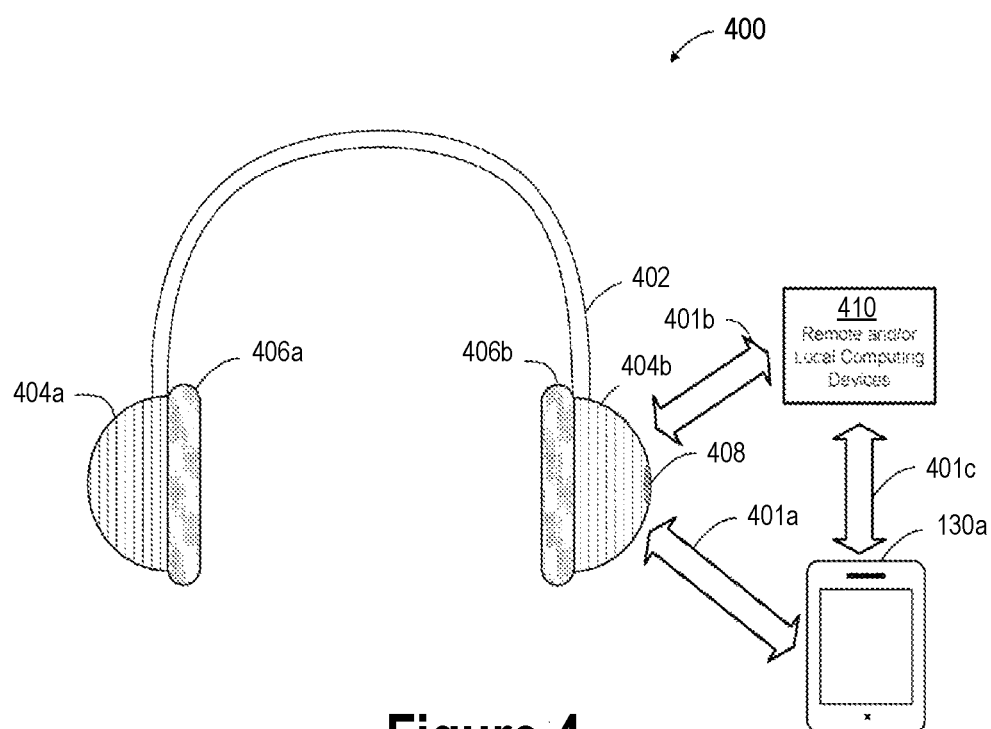
FIG. 4 is a diagram of an example headset assembly for the playback device of FIG. 3.

In some embodiments, one or more of the playback devices 110 may take the form of a wired and/or wireless headphone (e.g., an over-ear headset, an on-ear headset, or an in-ear headset). For instance, FIG. 4 shows an example headset assembly 400 ("headset 400") for such an implementation of one of the playback devices 110. As shown, the headset 400 includes a headband 402 that couples a first earcup 404*a* to a second earcup 404*b*. Each of the earcups 404*a* and 0244*b* may house any portion of the electronic components in the playback device 110, such as one or more speakers. Further, one or more of the earcups 404*a* and 404*b* may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406*a* and 406*b* that are coupled to ear cups 404*a* and 404*b*, respectively. The ear cushions 406*a* and 406*b* may provide a soft barrier between the head of a user and the earcups 404*a* and 404*b*, respectively, to improve user comfort and/or provide acoustic isolation from the ambient (e.g., passive noise reduction (PNR)).

As described in greater detail below, the electronic components of a playback device may include one or more network interface components (not shown in FIG. 4) to facilitate wireless communication over one more communication links. For instance, a playback device may communicate over a first communication link 401*a* (e.g., a BLUETOOTH link) with one of the control devices 130 and/or over a second communication link 401*b* (e.g., a WIFI or cellular link) with one or more other computing devices 410 (e.g., a network router and/or a remote server). As another possibility, a playback device may communicate over multiple communication links, such as the first communication link 401*a* with the control device 130*a* and a third communication link 401*c* (e.g., a WIFI or cellular link) between the control device 130*a* and the one or more other computing devices 410. Thus, the control device 130*a* may function as an intermediary between the playback device and the one or more other computing devices 410, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.)

It should be appreciated that one or more of the playback devices 110 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMD)s

Figures 1F, 1G:
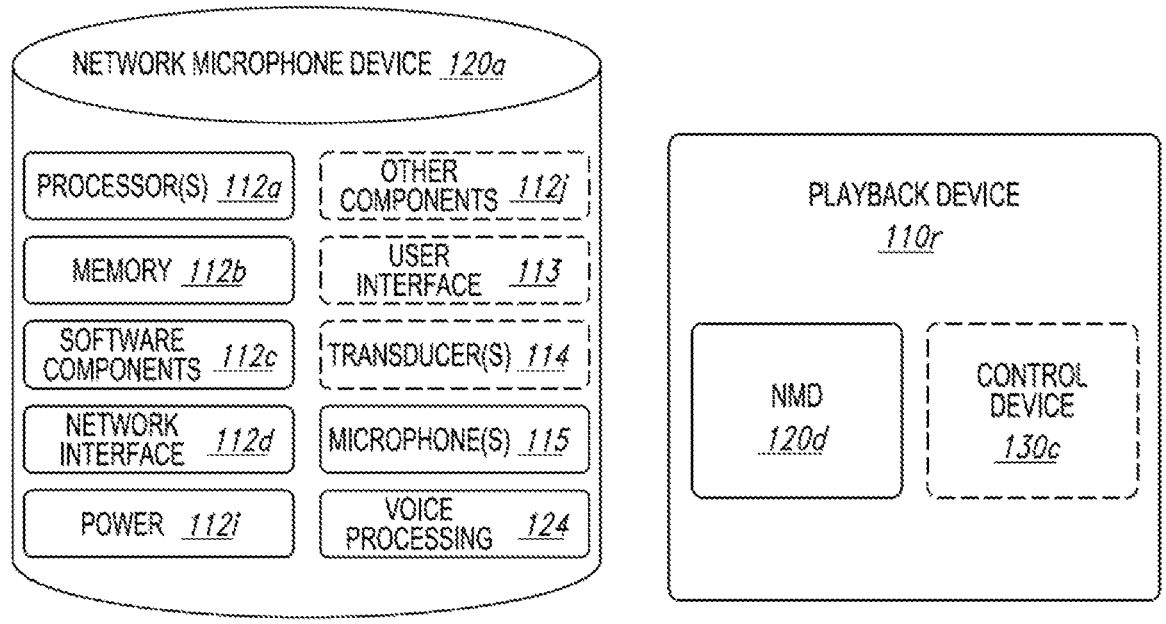
FIG. 1F is a block diagram of an example network microphone device.
FIG. 1G is a block diagram of an example playback device.

FIG. 1F is a block diagram of the NMD 120*a* (FIGS. 1A and 1B). The NMD 120*a* includes one or more voice processing components 124 and several components described with respect to the playback device 110*a* (FIG. 1C) including the processors 112*a*, the memory 112*b*, and the microphones 115. The NMD 120*a* optionally comprises other components also included in the playback device 110*a*

(FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing components 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing components 124 (FIG. 1F). The microphones 115 are configured to detect sound (i.e., acoustic waves) in the environment of the playback device 110r, which is then provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110r may include fewer than six microphones or more than six microphones. The playback device 110r optionally includes an integrated control device 130c. The control device 130c can comprise, for example, a user interface configured to receive user input (e.g., touch input, voice input) without a separate control device. In other embodiments, however, the playback device 110r receives commands from another control device (e.g., the control device 130a of FIG. 1B).

In operation, the voice processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112a.

In some implementations, the voice processing components 124 may detect and store a user's voice profile, which may be associated with a user account of the MPS 100. For example, voice profiles may be stored as and/or compared to variables stored in a set of command information or data table. The voice profile may include aspects of the tone of frequency of a user's voice and/or other unique aspects of the user's voice, such as those described in previously-referenced U.S. Patent Publication No. 2017-0242653.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing components 124 receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Controller Devices

Figure 1H:
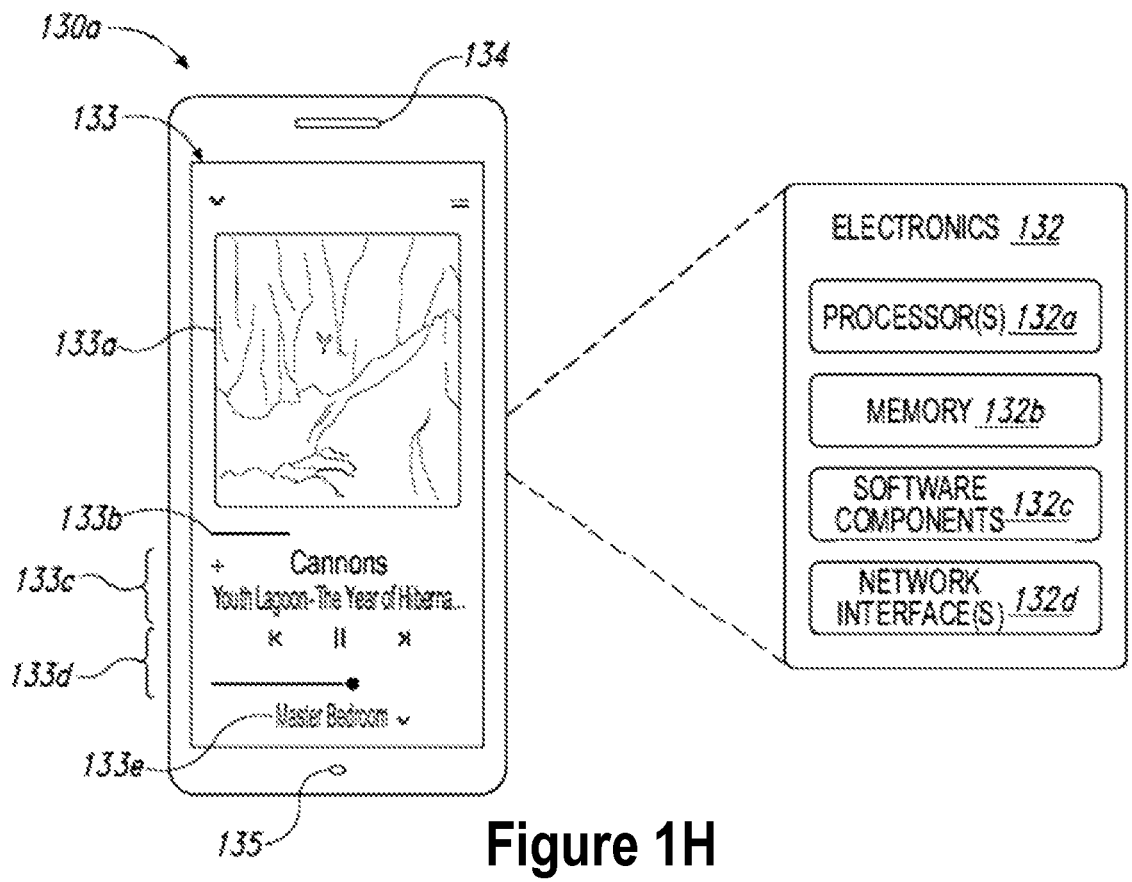
FIG. 1H is a partially schematic diagram of an example control device.
Figure 1I:
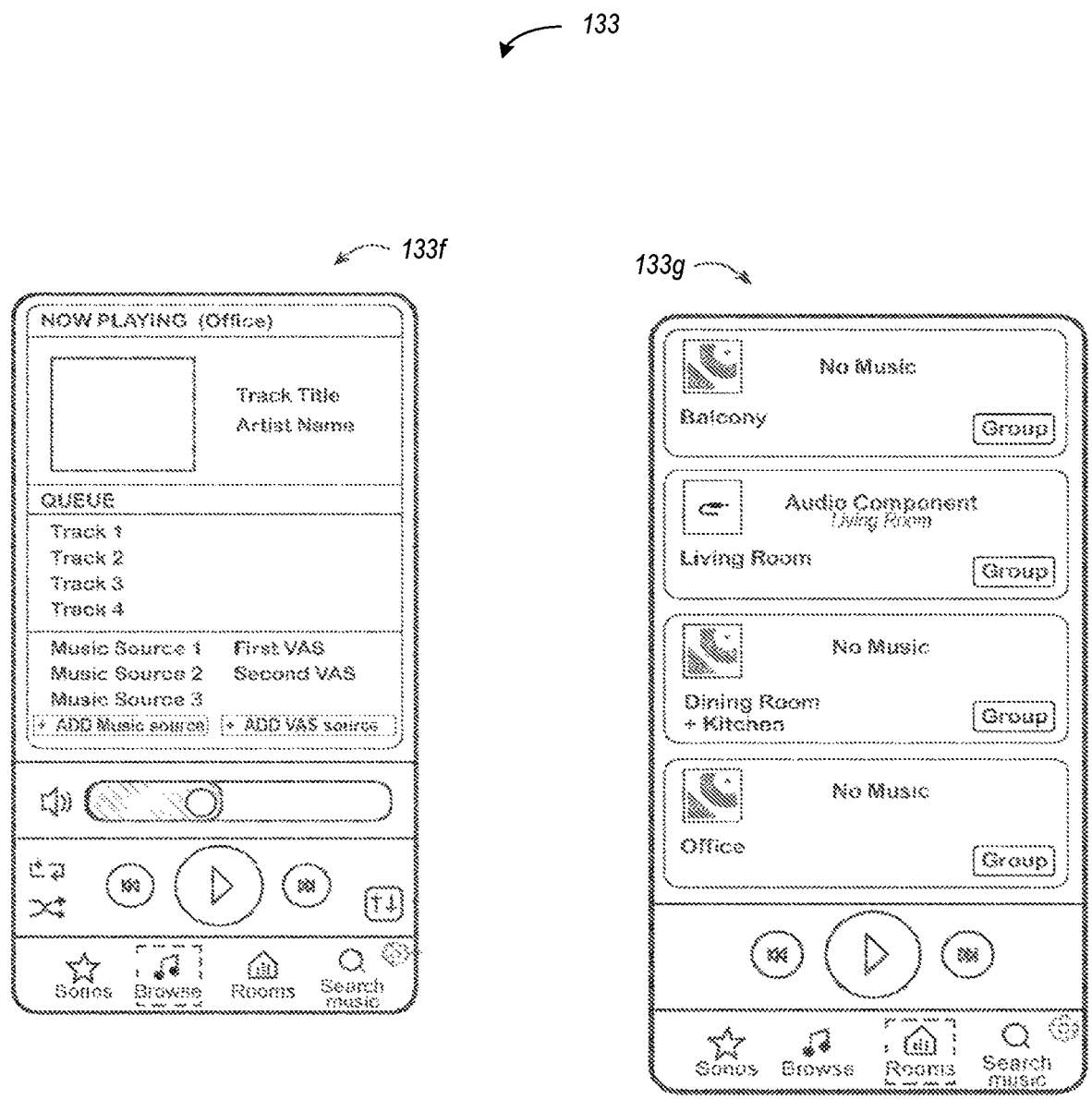
FIG. 1I is a schematic diagram of example user interfaces of the example control device of FIG. 1H.

FIG. 1H is a partially schematic diagram of one of the control device 130a (FIGS. 1A and 1i). As used herein, the term "control device" can be used interchangeably with "controller," "control device," or "control system." Among other features, the control device 130a is configured to receive user input related to the MPS 100 and, in response, cause one or more devices in the MPS 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the MPS 100. In other embodiments, as described above with respect to FIG. 1G, the control device 130a is integrated into another device in the MPS 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the MPS 100. The memory 132b can comprise data storage that can be loaded with one or more of the software components executable by the processor 302 to perform those functions. The software components 132c can comprise applications and/or other executable software configured to facilitate control of the MPS 100. The memory 112b can be configured to store, for example, the software components 132c, media playback system controller application software, and/or other data associated with the MPS 100 and the user.

The network interface 132d is configured to facilitate network communications between the control device 130a and one or more other devices in the MPS 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.12, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130a to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others. Additional description of zones and groups can be found below with respect to FIGS. 1J through 2.

The user interface 133 is configured to receive user input and can facilitate control of the MPS 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system. FIG. 1I shows two additional user interface displays 133f and 133g of user interface 133. Additional examples are also possible.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

e. Suitable Playback Device Configurations

Figures 1J, 1K:
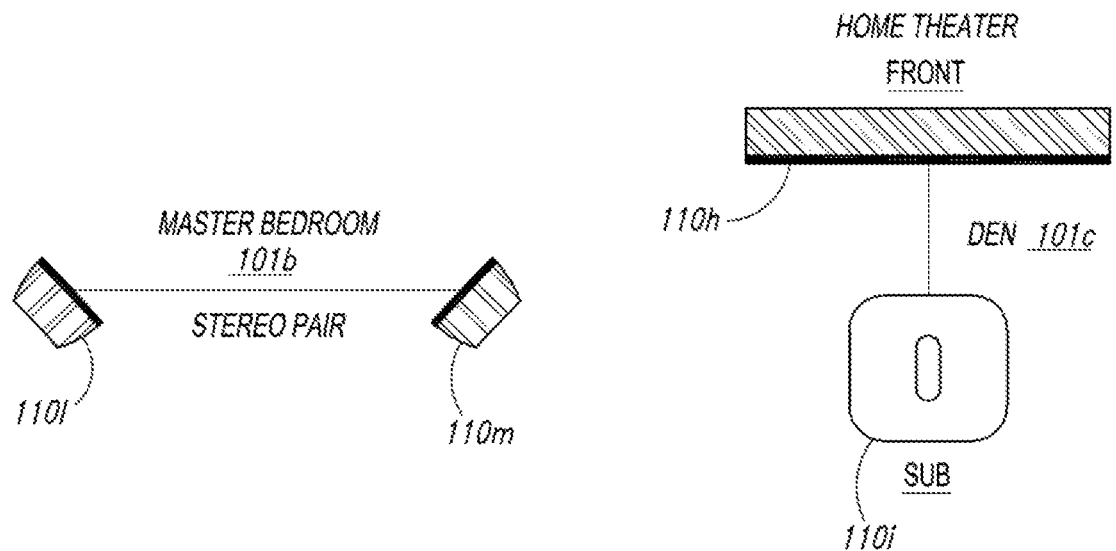
FIGS. 1J through 1M are schematic diagrams of example corresponding media playback system zones.
Figures 1L, 1M:
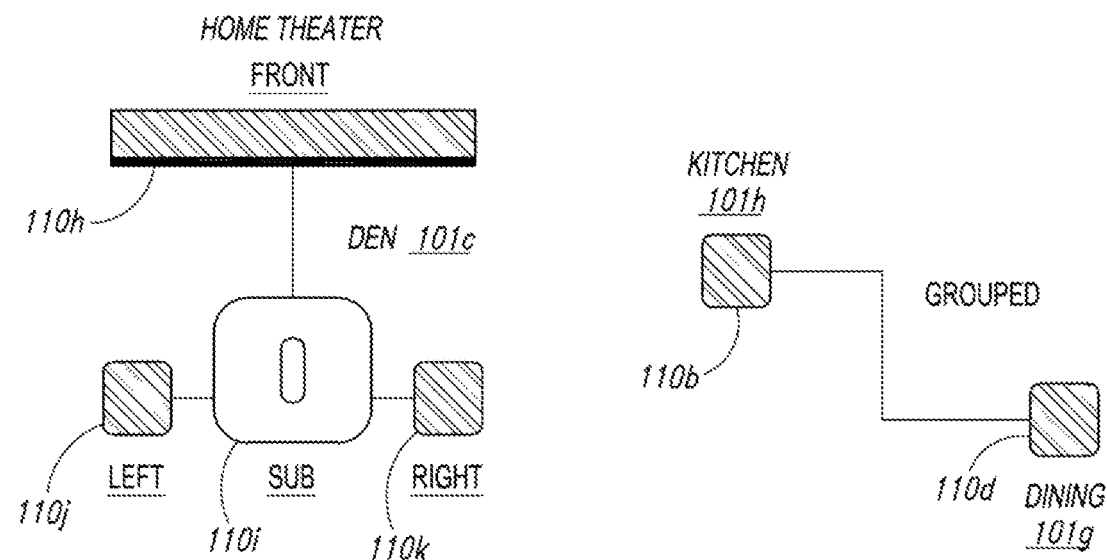
Figure 2:
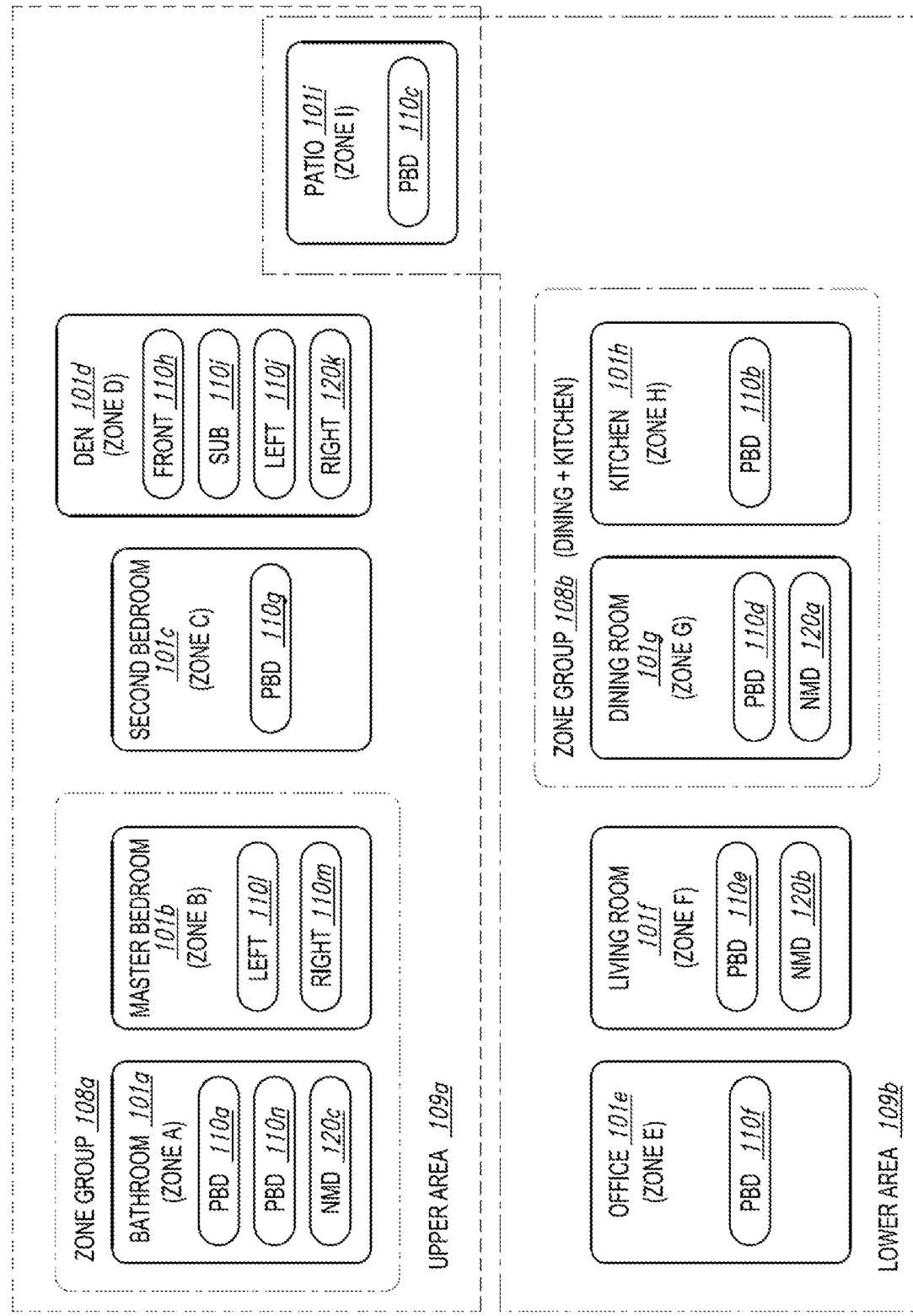
FIG. 2 is a schematic diagram of example media playback system areas.

FIGS. 1J through 2 show example configurations of playback devices in zones and zone groups. Referring first to FIG. 2, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110m (e.g., a right playback device) to form Zone B. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback zones 110g and 110h can be merged to form a merged group or a zone group 108b. The merged playback zones 110g and 110h may not be specifically assigned different playback responsibilities. That is, the merged playback zones 110h and 110i may, aside from playing audio content in synchrony, each play audio content as they would if they were not merged.

Each zone in the MPS 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1J, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1K, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1L shows the Front and SUB devices 110*h* and 110*i* further bonded with Left and Right playback devices 110*j* and 110*k*, respectively. In some implementations, the Left and Right playback devices 110*j* and 110*k* can be configured to form surround or "satellite" channels of a home theater system. The bonded playback devices 110*h*, 110*i*, 110*j*, and 110*k* may form a single Zone D (FIG. 2).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110*a* and 110*n* in the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 2, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 2. In some embodiments, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1M). Identifiers associated with the Kitchen may indicate the same or similar information by virtue of the Kitchen being part of the Dining+Kitchen zone group 108*b*. Other example zone variables and identifiers are described below.

In yet another example, the MPS 100 may include variables or identifiers representing other associations of zones and zone groups, such as identifiers associated with Areas, as shown in FIG. 2. An area may involve a cluster of zone groups and/or zones not within a zone group. For instance, FIG. 2 shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682, 506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

Figure 3:
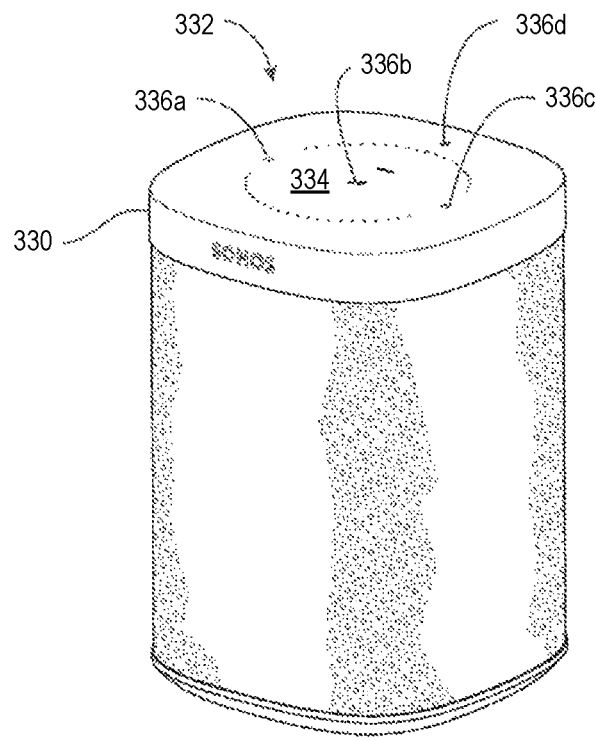
FIG. 3 is an isometric diagram of an example playback device housing.

FIG. 3 shows an example housing 330 of the playback device 110 that includes a user interface in the form of a control area 332 at a top portion 334 of the housing 330. The control area 332 includes buttons 336-*c* for controlling audio playback, volume level, and other functions. The control area 332 also includes a button 236d for toggling the microphones 222 to either an on state or an off state. The control area 332 is at least partially surrounded by apertures formed in the top portion 334 of the housing 330 through which the microphones 222 (not visible in FIG. 3) receive the sound in the environment of the playback device 102. The microphones 222 may be arranged in various positions along and/or within the top portion 334 or other areas of the housing 330 so as to detect sound from one or more directions relative to the playback device 110.

In some embodiments, the playback device 110 may take the form of a wired and/or wireless headphone (e.g., an over-ear headset, an on-ear headset, or an in-ear headset). For instance, FIG. 4 shows an example headset assembly 400 ("headset 400") for such an implementation of the playback device 110. As shown, the headset 400 includes a headband 402 that couples a first earcup 404a to a second earcup 404b. Each of the earcups 404a and 404b may house any portion of the electronic components in the playback device 110, such as one or more speakers. Further, one or more of the earcups 404a and 404b may include a user interface for controlling audio playback, volume level, and other functions. The user interface may include any of a variety of control elements such as a physical button 408, a slider, a knob, and/or a touch control surface. As shown in FIG. 4, the headset 400 may further include ear cushions 406a and 406b that are coupled to ear cups 404a and 404b, respectively. The ear cushions 406a and 406b may provide a soft barrier between the head of a user and the earcups 404a and 404b, respectively, to improve user comfort and/or provide acoustic isolation from the ambient (e.g., passive noise reduction (PNR)).

III. Example Techniques for Reducing Time to Music

As discussed above, a playback device must undertake various initialization operations when it is initially powered on, or when it is woken up from a deep sleep state in which some or all of its internal components are powered off, before the playback device is capable of playing back audio content over a wireless network connection. Nonetheless, for some playback devices, such as portable playback devices, users may expect a relatively short time-to-music (TTM) in such situations. Thus, techniques that reduce a playback device's TTM can lead to an improved user experience.

Figure 5:
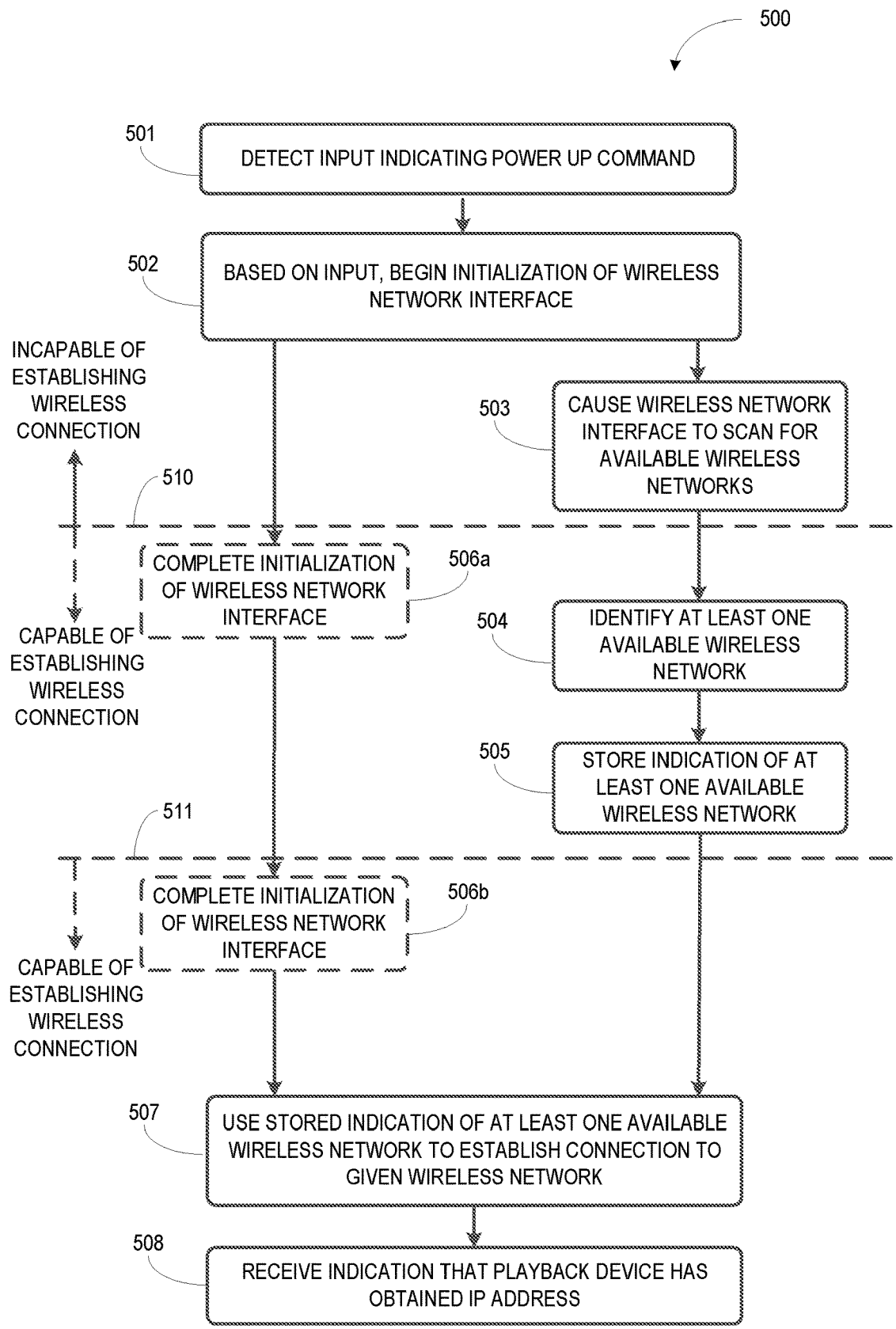
FIG. 5 is a flowchart showing example operations for reducing time to music.

FIG. 5 is a flowchart 500 that illustrates one example implementation for reducing a playback device's TTM that involves the playback device performing two or more operations related to establishing a wireless network connection in parallel. The playback device may be, for example, any of the playback devices 110 discussed above and shown in FIGS. 1A-4, such as the portable, battery-powered playback device 110c or the wearable playback device 110o.

Beginning at block 501, the playback device 110 may detect an input indicating a command to power up the playback device 110. For instance, the playback device 110 may be completely powered off or in a deep sleep state in which some or all of its internal electronic components, such as processor(s) 112a and/or wireless network interface(s) 112e, are powered off to conserve battery power.

Further, the detected input may take various forms, such as a button press, touch input, or similar interaction received via the user interface 113. In some cases, the detected input may additionally be indicative of a command to perform a given audio playback function. As one illustrative example, a user who wishes to play back audio content on portable playback device 110, which has been sitting idle outdoors on the user's patio, may press a "Play" button on the device. This input may serve as a command to both "wake" the playback device from its powered-off state as well as a command to begin playback of audio content from a playback queue associated with the playback device, once it is capable of doing so. Other examples are also possible.

At block 502, based on the detected input, the playback device 110 may begin initialization of the wireless network interface 112e. As noted above, the wireless network interface 112e may include one or more wireless network interfaces that the playback device 110 may utilize to communicate over different types of wireless networks, such as a WIFI network and/or a BLUETOOTH network, among other possibilities. For instance, the portable playback device 110 on the user's patio may begin initialization the wireless network interface 112e in order to scan for available WIFI networks and establish (e.g., re-establish) a connection to the user's home WIFI network.

Beginning initialization of the wireless network interface 112e may take various forms. For instance, the playback device 110 may begin loading one or more software drivers that are used for operation of the wireless network interface 112e. In some cases, the software drivers for the wireless network interface 112e may need to be fully loaded before the playback device 110 can use the wireless network interface 112e to establish a network connection. This is represented by the dashed line 510 in one example of FIG. 5, above which the playback device 110 is incapable of establishing a wireless network connection.

However, the wireless network interface 112e might not regain all of its capabilities at once, upon completion of the initialization process. Rather, certain functionalities may be enabled before others as the firmware and hardware of the wireless network interface 112e are readied and the necessary data structures are allocated. For example, once certain components of the one or more software drivers are partially loaded, the wireless network interface 112e may be capable of scanning for available wireless networks of a given type, even though establishing a connection to such a network is not yet possible. For illustration, the initialization may occur in a bottoms-up approach where lower-level layers of a network stack are initialized before higher-level layers. In such scenarios, a wireless chip (e.g., a WIFI chip) may become ready to execute an operation during initialization (e.g., perform a scan for one or more networks) before software executing on an application processor that communicates with the WIFI chip (e.g., an operating system such as LINUX and/or a WIFI driver) is capable of, for example, initiating a set of one or more operations to establish a connection to a particular network.

Accordingly, at block 503, after beginning initialization of the wireless network interface 112e but before the playback device 110 is capable of establishing a connection to a WIFI network via the wireless network interface 112e (e.g., before the playback device completes installing the one or more software drivers), the playback device 110 may cause the wireless network interface 112e to scan for available WIFI wireless networks.

In this way, the playback device 110 can save time and reduce its TTM as operations that would otherwise be performed in sequence are performed in simultaneously. In particular, initialization of the wireless network interface 112e (e.g., loading of the one or more software drivers) may continue while the scan for available networks occurs in parallel. Additional aspects of the scan for available networks at block 503 that may further reduce TTM will be discussed below in relation to FIG. 6.

At block 504, the playback device 110 may identify, via the wireless network interface 112e, at least one available wireless network of the wireless network type that is the subject of the scan. For instance, the playback device's scan for available WIFI networks may identify the user's home WIFI network, among others (e.g., a neighbor's WIFI network). At block 505, the playback device 110 may store an indication of the at least one available wireless network that was identified.

At some point after the scan for available wireless networks has begun, the playback device 110 will complete initialization of the wireless network interface 112e (e.g., complete loading the one or more drivers) such that the playback device 110 is capable of establishing a connection to a WIFI network. In this regard FIG. 5 illustrates two example scenarios, each depicted by dashed lines. In the first example, shown by dashed line 510 and dashed block 506a, the playback device 110 may complete initialization of the wireless network interface 112e, and thus be capable of establishing a connection to a WIFI network, before the scan has identified an available network at block 504. Nonetheless, scanning for available wireless networks, which would normally commence upon completing the initialization of the wireless network interface 112e, is already underway, and thus the playback device's TTM has been reduced.

Alternatively, FIG. 5 illustrates a second example scenario, shown by dashed line 511 and dashed block 506b, in which the scan identifies at least one available wireless network and stores an indication thereof before initialization of the wireless network interface 112e is complete. Consequently, once the playback device 110 completes initialization of the wireless network interface 112e at block 506b, the playback device 110 may immediately use the stored indication to connect to the identified wireless network. As a result, the time that would have been needed to perform the scan, identify the available network, and store the indication—all performed after initialization of the wireless network interface 112e was completed—has been eliminated from the playback device's TTM.

It should be understood that the examples shown in FIG. 5 and discussed above represent just two of many possibilities. For example, the playback device 110 may complete initialization of the wireless network interface 112e at any point during the scan (e.g., at any point between dashed lines 510 and 511), including concurrently with identifying the one or more available wireless networks. Other examples are also possible.

At block 507, after the playback device 110 is capable of establishing a connection to a WIFI network via the wireless network interface 112e, the playback device 110 may use the stored indication of the one or more available wireless network to establish a connection to a given wireless network of the at least one available wireless network. For instance, the playback device 110 may connect to the user's home WIFI network, which may be recognized by the playback device 110 as a known network for which the playback device 110 may have security information (e.g., a security key or password) stored in memory.

As noted above, the detected input indicating a command to power up the playback device 110 may also indicate a command to begin play back of audio content. However, the playback device 110 may need to perform one or more additional steps, depending on the type of wireless network to which the playback device 110 has established a connection, among other factors, before the play back command can be executed.

For example, at block 508, the playback device 110 may receive an indication that the playback device 110 has obtained an IP address. In some cases, the playback device 110 may be assigned an IP address by a DHCP service running on an access point of the user's WIFI network. Other examples of how the playback device 110 may obtain an IP address are also possible. Whatever its source, a valid IP address may allow the playback device 110, via a software application for retrieving and playback audio content over the user's WIFI network, to execute the playback command.

Figure 6:
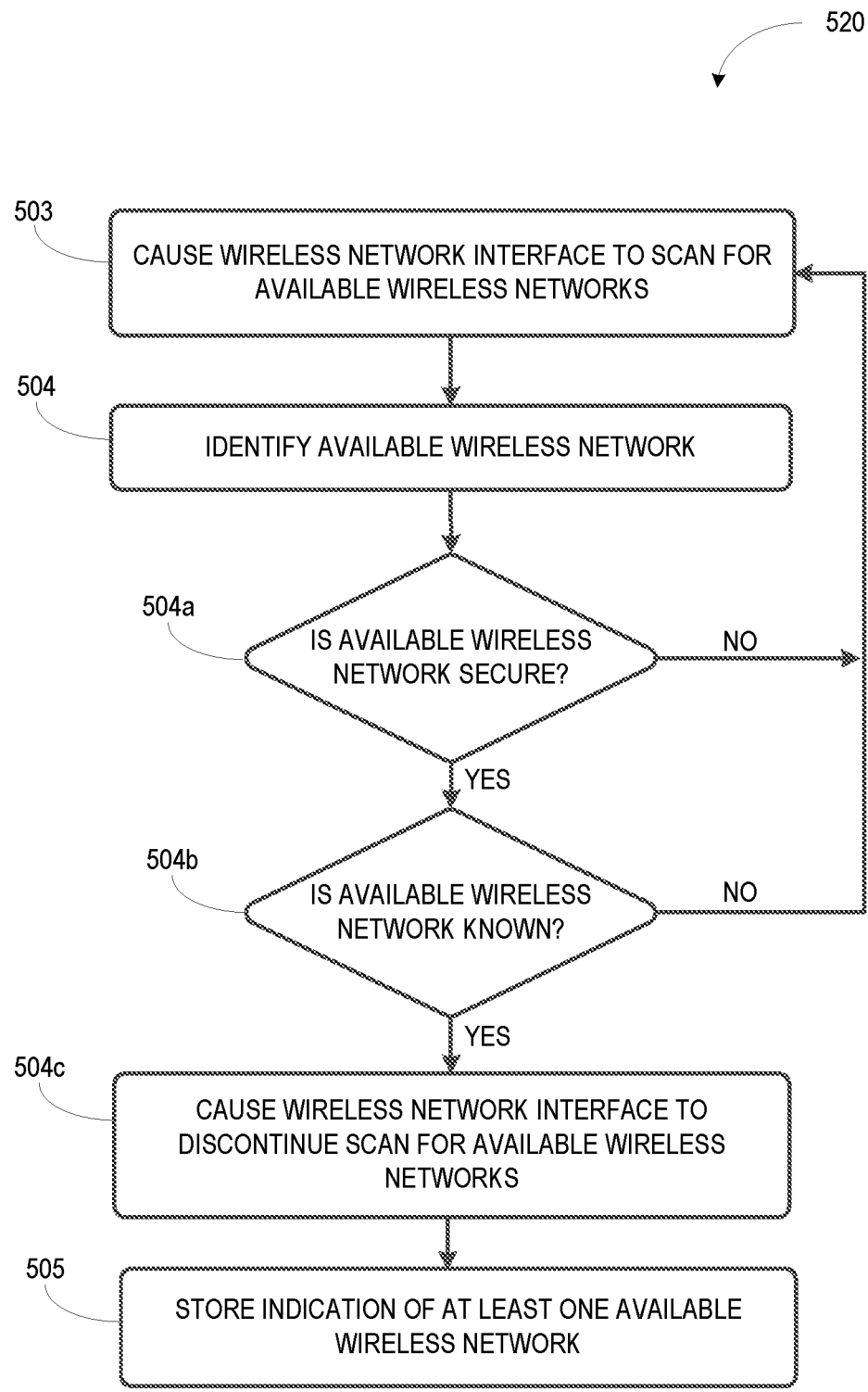
FIG. 6 is a flowchart showing example operations for scanning for available wireless networks.

Turning now to FIG. 6, a flowchart 520 illustrates an example implementation related to scanning for available wireless networks before the playback device 110 is capable of establishing a wireless network connection to a WIFI network. In particular, the blocks shown in FIG. 6 may represent a more detailed view of the operations that the playback device 110 performs from block 503 to block 505 shown in FIG. 5, which may result in a reduced TTM in some cases. Thus, at blocks 503 and 504, the computing device may cause the wireless network interface 112e to scan for available wireless networks and then identify at least one or more available wireless networks, as discussed above.

In some embodiments, an "available" wireless network may refer to a wireless network that is within range of (e.g., detectable by) the playback device 110, whether or not additional security information is required to establish a connection. In this regard, although the underlying goal of reducing TTM may be served by connecting to an identified wireless network as quickly as possible, it may be undesirable for the playback device 110 to connect to an unsecured wireless network that is identified.

Accordingly, at block 504a, the playback device 110 may determine whether an identified wireless network is secure or unsecure. If the identified wireless network is unsecure, or "open," the playback device 110 may continue to scan for available wireless networks. In some cases, the playback may store an indication for of the identified, unsecured wireless network.

If the identified wireless network is secure, the playback device 110 may determine, at block 504b, whether the identified wireless network is known to the playback device 110. For example, the playback device 110 may determine whether security information corresponding to the identified wireless network is stored in memory on the playback device 110. If no such security information is stored in memory, the playback device 110 may determine that the identified wireless network is unknown, and may continue scanning for available networks at block 503.

However, if the identified wireless network is a known network for which security information is stored in memory, the playback device 110 may cause the wireless network interface 112e to discontinue (e.g., stop) the scan for available wireless networks at block 504c. This may reduce the time needed to complete the scan and/or allow the playback device 110 utilize those resources (e.g., computational resources, battery power) for other processes. At block 505, as discussed above, the playback device 110 may store an indication of the available wireless network (e.g., including an indication of a service set identifier (SSID) associated with the available wireless network and/or an indication of at least one frequency channel over which the available wireless network operates).

A given wireless network, such as the user's WIFI network in current example, may be known to the playback device 110 based on the playback device 110 being previously connected to it. In this situation, the playback device 110 may take additional steps that may reduce the time needed to identify the user's WIFI network via the network scan. For instance, the playback device 110 may have been powered off or otherwise entered a low-power state (e.g., automatically after a pre-determined period without user interaction) while connected to the user's WIFI network on a given wireless frequency channel, such as channel 11 in the 2.4 GHz frequency range. The playback device 110 may store an indication of this frequency channel in memory. Upon beginning initialization of the wireless network interface 112e at block 502, the playback device 110 may read the stored frequency channel from memory and cause the wireless network interface 112e to scan for available wireless networks, at block 503, starting from the stored frequency channel. Thus, wireless network interface 112e may begin scanning on channel 11 in the 2.4 GHz frequency range, rather than a default channel, which might be channel 1. In this way, the playback device 110 may be able to quickly identify the user's WIFI network and discontinue the network scan, which may further reduce the playback device's TTM.

It should be understood that certain operations shown in FIG. 6 may be performed in a different order, substantially simultaneously with other operations, or may be omitted. For instance, the playback device 110 might determine whether an identified wireless network is known without determining if it is secure or unsecure. For example, the playback device 110 might establish some types of wireless connections (e.g., some BLUETOOTH connections) without using any additional security information. In these situations, the playback device 110 may determine that the wireless network is a "known" network based on a stored indication that the playback device 110 has connected to it before.

Figure 7:
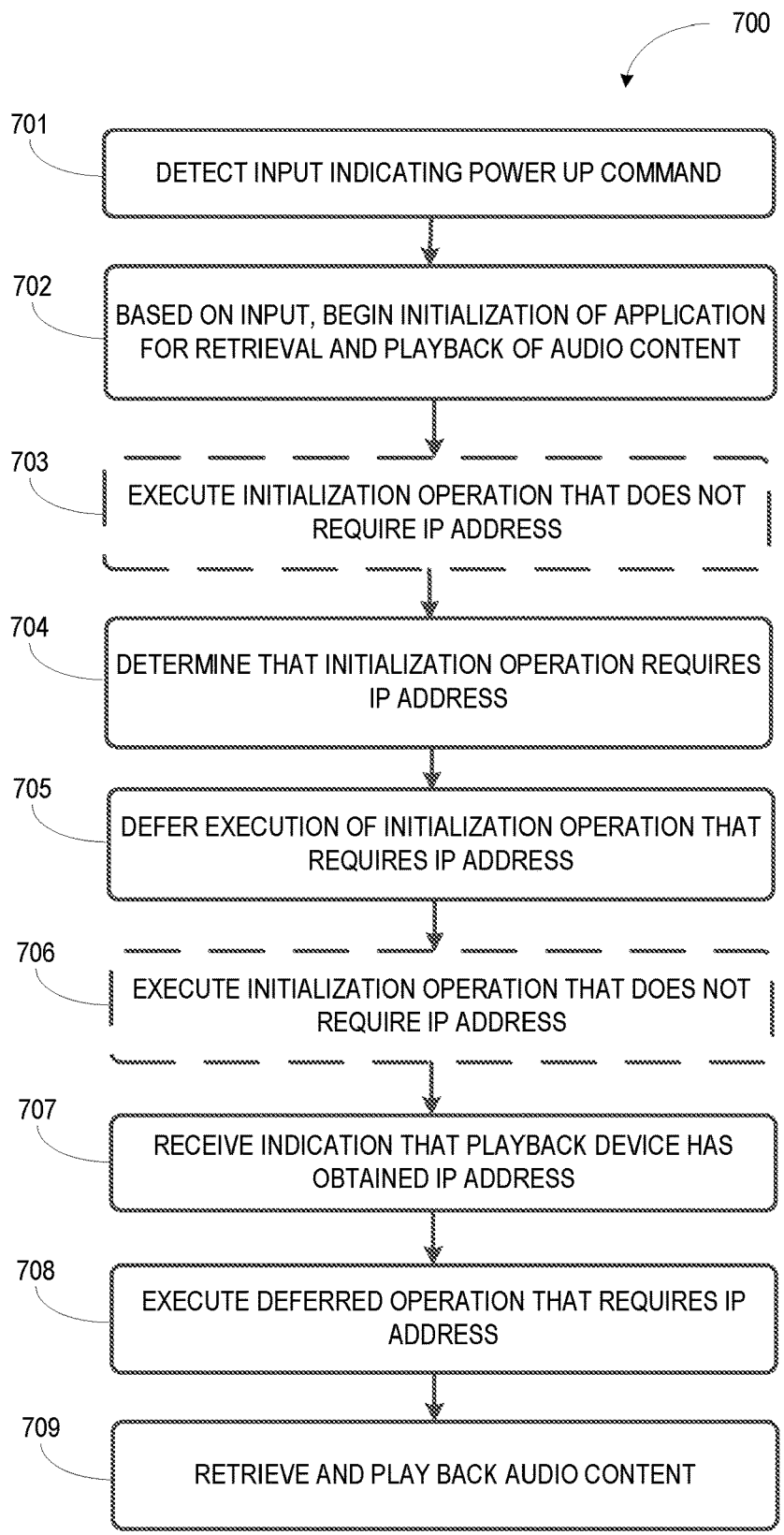
FIG. 7 is another flowchart showing example operations for reducing time to music.

Turning now to FIG. 7, a flowchart 700 is shown that illustrates another example of operations that the playback device 110 may perform to reduce TTM, relating to the startup of a software application for retrieval and playback of audio content over a wireless network. As discussed further below, the flowchart 700 may be implemented by the playback device 110 independent of, or in addition to, the examples discussed above and shown in FIGS. 5 and 6.

In many cases, another pre-requisite for the playback device 110 to play back audio content over a wireless network (e.g., from a cloud-based streaming media service) is the initialization of a software application that coordinates such playback. In the context of a WIFI network, the software application, which may be referred to as a "player application," may be responsible for identification and retrieval of audio content over the WIFI network, communication and coordination with other playback devices and/or control devices over the network, among other operations. Thus, many of the player application's functions require not only a connection to a WIFI network, but also a valid IP address to facilitate such communications. Therefore, many conventional playback devices may not begin initialization of the player application until a valid IP address has been obtained.

However, similar to the initialization of the wireless network interface 112e discussion above, there may be some operations associated with initialization the player application that can be performed before an IP address is obtained in order to reduce the total initialization time for the player application, and by extension, the TTM. Thus, the playback device 110 may begin initialization of the player application before obtaining an IP address, and in some cases, before a connection to the WIFI network is established.

Accordingly, at block 701, the playback device 110 may detect an input indicating a command to power up the playback device 110. The input may be similar to the input detected at block 501, wherein the user presses a button on portable playback device 110, which has been sitting idle outdoors on the user's patio. Various other examples are also possible At block 702, based on the detected input, the playback device 110 may begin initialization of the player application for retrieval and playback of audio content via the wireless network interface 112e, before the playback device 110 has obtained an IP address. For instance, the playback device 110 may begin executing one or more operations that do not require an IP address. For example, the playback device may begin executing one or more operations associated with initialization of one or more software decoders. Such one or more software decoders may be configured to, for example, decode encoded audio to generate uncompressed audio, such as pulse-code modulation (PCM) audio, for playback.

In some embodiments, the playback device 110 may determine whether a given initialization operation of the player application requires an IP address (and/or a connection to a WAN) or not. If it does not, the playback device 110 may execute the initialization operation, as shown at block 703. Alternatively, the playback device 110 may determine, at block 704, that an initialization operation of the player application requires an IP address (and/or a connection to a WAN). For instance, a given initialization operation may involve the playback device 110 initializing a handshake connection with one or more cloud-based servers associated with the user's media playback system 100. If the playback device 110 attempts to execute this operation before an IP address is obtained, it may result in the playback device 110 devoting computation resources and battery power to a task that cannot be completed, and could be better spent elsewhere. Further, if such an operation is attempted without an IP address and is unsuccessful after several tries, or after a certain period of time, the operation may be discontinued such that the playback device 110 will not re-attempt the operation until a time-out period, such as 10 seconds, expires. This may be disadvantageous if the playback device 110 then obtains an IP address during the time-out period and then is delayed in completing the initialization of the player application, resulting in an increased TTM.

Therefore, at block 705, the playback device 110 may defer execution of an initialization that requires the playback device 110 to have an IP address. This may allow the playback device 110 to proceed with one or more other initialization operations that do not require an IP address, as shown at block 706, resulting in a more efficient use of the playback device's computational resources and battery power.

At block 707, the playback device 110 may receive an indication that it has obtained an IP address. For example, block 707 may resemble block 508 discussed above, as the playback device 110 may be assigned an IP address by a DHCP service running on an access point of the user's WIFI network. Thereafter, based on receiving the indication that the playback device 110 has obtained the IP address, the playback device 110 may execute the deferred initialization operation(s) at block 708. In this way, various initialization operations of the player application that would normally begin only after obtaining an IP address may already be completed, which may cause the player application to be ready sooner and thereby reduce the playback device's TTM.

Accordingly, at block 709, after the player application has completed initialization, the playback device 110 may retrieve and playback audio content via the user's WIFI network. For example, the input that indicated the power-up command may also be an input to begin playback of audio content from the playback device's associated playback queue, which may involve streaming the audio content from one of the user's cloud-based media streaming services.

Additionally or alternatively, the playback device 110 may determine that one or more of the initialization operations that require the presence of an IP address can be fully or partially executed by assigning a placeholder IP address. Thus, the playback device 110 may assign a placeholder IP address (e.g., 000.000.0.0) for use by the initialization operation, and then execute the initialization operation using the placeholder. Then, rather than executing a deferred operation after receiving the IP address, as discussed above, the playback device 110 may instead update the placeholder IP address that was used during the initialization operation with the obtained IP address, which may be accomplished relatively quickly. In some cases, this may allow the playback device 110 to complete even more of the initialization process for the player application before the IP address is obtained, further reducing the playback device's TTM.

As suggested above, the operations related to reducing TTM in the context of initializing the playback device's wireless network interface 112e, as shown in FIG. 5, may overlap in some cases with the operations related to reducing TTM in the context of initializing the player application, as shown in FIG. 7. In this regard, FIG. 8 illustrates a flowchart 800 showing one example of how these operations may be executed in parallel.

Figure 8:
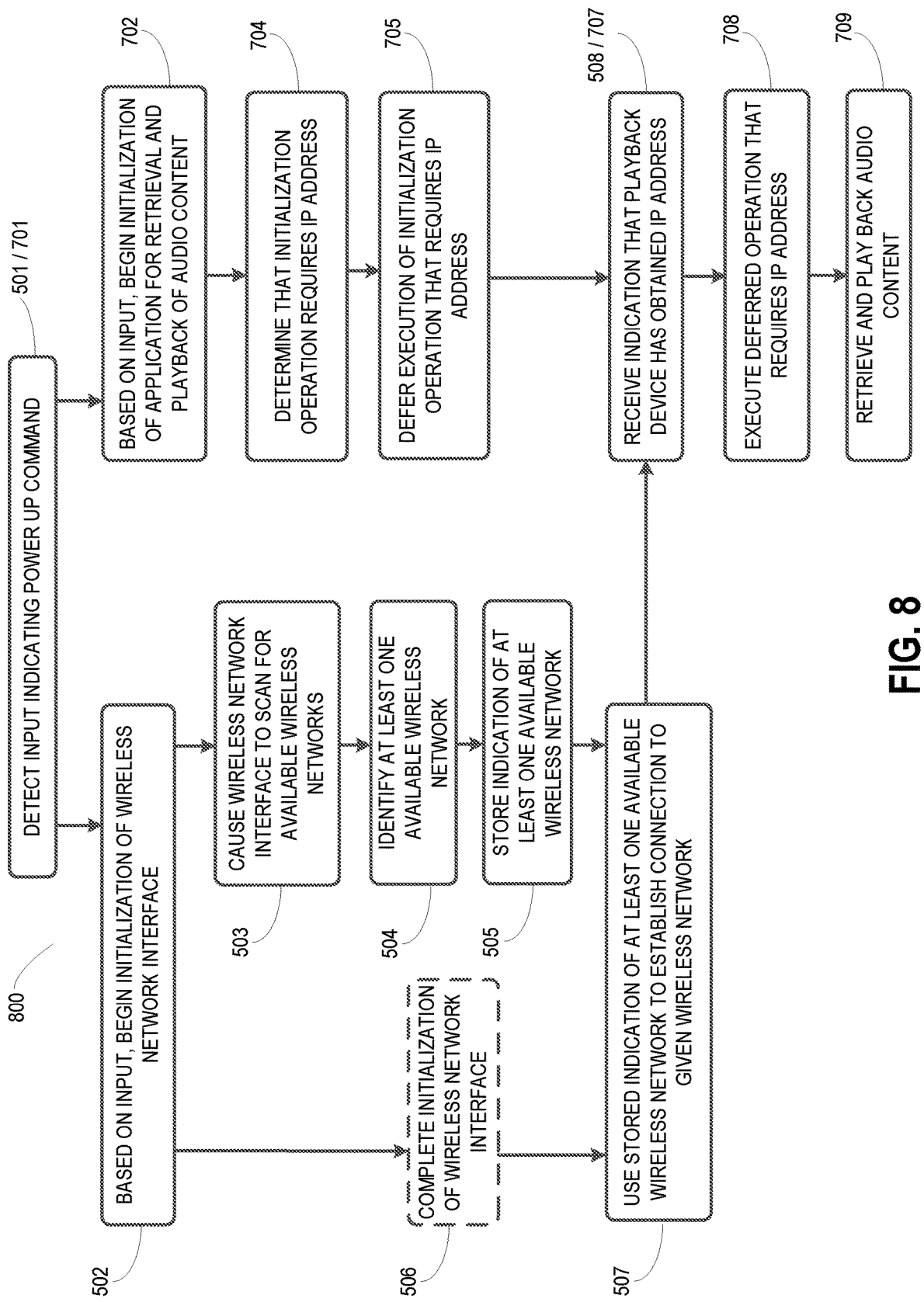
FIG. 8 is another flowchart showing example operations for reducing time to music.

In FIG. 8, some of the operations shown in Figure and 5 and FIG. 7 have been simplified or condensed for the sake of clarity. However, it should be understood that any of the individual examples and variations noted above are equally applicable, in any combination, to the example depicted by FIG. 8.

As discussed above, the playback device 110 may detect an input indicating a command to power up the playback device 110. As discussed above, this input may correspond to a user's button press to power up the portable playback device in order to play back audio content via the user's WIFI network. As shown in FIG. 8, this input may correspond to both blocks 501 and 701 discussed above, and may cause the playback device 110 to begin initialization of both the wireless network interface 112e as well as the player application, as shown at blocks 502 and 702 respectively. Thereafter, the playback device 110 may proceed in parallel with various operations, including at least (i) loading the one or more drivers for the wireless network interface 112e, (ii) scanning for available wireless networks, (iii) performing one or more initialization operations for the player application that do not require an IP address (and/or a connection to a WAN), and (iv) deferring operating of one or more initialization operations for the player application that do require an IP address.

There are numerous possibilities for the order in which these parallel operations may be completed, which may depend on the network conditions in the area of the user's WIFI network, among other possibilities. Thus, the TTM benefits provided by the techniques discussed herein may also vary in different situations. As one possibility, the network scan may identify the user's WIFI network relatively quickly, such that blocks 503-505 are completed before the initialization of the wireless network interface 112e is complete, and while the playback device 110 is still executing and/or deferring initialization operations of the player application at blocks 704-705 based on the need for an IP address. Once initialization of the wireless network interface 112e is complete at block 506, the playback device 225 may immediately establish a connection to the user's WiFi network at block 507. After obtaining an IP address at block 508, which also corresponds to block 707, the playback device 110 may execute any deferred initialization operations of the player application at block 708, as well as any other remaining initialization operating that have yet to be completed. In this regard, any remaining, undeferred initialization operations of the player application that require and IP address can be executed without deferral.

As another possibility, all of the initialization operations of the player application may be either executed or deferred and the one or more drivers for the wireless network interface 112e may be fully loaded before the network scan identifies the user's WIFI network. For example, the playback device 110 may have been recently connected to another known wireless network, such as an office WIFI network, such that the previously stored wireless communication channel does not correspond to the channel used by the user's home WIFI network. Additionally or alternatively, the playback device 110 may be experiencing radio frequency interference from one or more other wireless networks or devices that causes the network scan to take longer than it otherwise would. In this example, the playback device 110 may establish a connection to the user's WIFI network as soon as it is identified by the scan, and then execute the deferred operations of the player application initialization as soon as an IP address is received. Alternatively, if the playback device 110 assigned a placeholder IP address for any of the initialization operations of the player application, the playback device may update the placeholder IP address(es) with the obtained IP address. Numerous other variations of the operations shown in FIG. 8 are also possible.

As noted above, although some examples discussed herein are generally presented as providing benefits to portable playback devices and users thereof, the examples are also applicable to stationary playback devices. For instance, TTM may be reduced at power up whenever a user relocates a stationary playback device, which may provide a positive user experience. As another possibility, a user may prefer that her stationary playback devices, despite having always-on capability via an external power source, enter a deep sleep state when idle to reduce power consumption, similar to a portable playback device. Similarly, a user may set the stationary playback devices of her media playback system to operate in a deep sleep or completely off state during certain hours of the day (e.g., overnight or during the middle of the day). Various other examples are also possible.

FIGS. 5-8 include one or more operations, functions, or actions as illustrated by one or more of operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowcharts shown in FIGS. 5-8 and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the processes and methods disclosed herein, each block in FIGS. 5-8 may represent circuitry and/or machinery that is wired or arranged to perform the specific functions in the process.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device comprising:
   at least one processor;
   a wireless network interface;
   at least one non-transitory computer-readable medium; and
   program instructions stored on the at least one non-transitory computer-readable medium that are executable by the at least one processor such that the playback device is configured to:
      begin initialization of the wireless network interface;
      after beginning initialization of the wireless network interface but before the playback device is capable of establishing a connection to at least one wireless network type via the wireless network interface, cause the wireless network interface to scan for available wireless networks of the at least one wireless network type;
      identify at least one available wireless network of the at least one wireless network type; and
      after the playback device is capable of establishing a connection to the at least one wireless network type via the wireless network interface, use a stored indication of the at least one available wireless network to establish a connection to a given wireless network of the at least one available wireless network.

2. The playback device of claim 1, further comprising program instructions stored on the at least one non-transitory computer-readable medium that are executable by the at least one processor such that the playback device is configured to:
   after identifying the at least one available wireless network, store a respective indication of each available wireless network,
      wherein the program instructions that are executable by the at least one processor such that the playback device is configured to use the stored indication of the at least one available wireless network to establish the connection to the given wireless network comprise program instructions that are executable by the at least one processor such that the playback device is configured to:
         use the stored respective indication of the given wireless network to establish the connection to the given wireless network.

3. The playback device of claim 1, wherein the program instructions that are executable by the at least one processor such that the playback device is configured to begin initialization of the wireless network interface comprise program instructions that are executable by the at least one processor such that the playback device is configured to:

begin loading one or more software drivers for the wireless network interface.

4. The playback device of claim 3, wherein the program instructions that are executable by the at least one processor such that the playback device is configured to scan for available wireless networks comprise program instructions that are executable by the at least one processor such that the playback device is configured to:
scan for available wireless networks before the playback device completes loading the one or more software drivers for the wireless network interface.

5. The playback device of claim 1, wherein the program instructions that are executable by the at least one processor such that the playback device is configured to begin initialization of the wireless network interface comprise program instructions that are executable by the at least one processor such that the playback device is configured to:
begin initialization of the wireless network interface based on detecting an input indicating a command to power up the playback device.

6. The playback device of claim 5, wherein the input indicating the command to power up the playback device is received via a user interface of the playback device.

7. The playback device of claim 5, further comprising program instructions stored on the at least one non-transitory computer-readable medium that are executable by the at least one processor such that the playback device is configured to:
before detecting the input indicating the command to power up the playback device:
connect to the given wireless network on a given wireless frequency channel;
store an indication of the given wireless frequency channel; and
power down the playback device,
wherein the program instructions that are executable by the at least one processor such that the playback device is configured to scan for available wireless networks comprise program instructions that are executable by the at least one processor such that the playback device is configured to:
cause the wireless network interface to scan for available wireless networks starting from the given wireless frequency channel.

8. The playback device of claim 7, wherein the given wireless network is a secure wireless network for which security information is stored on the playback device, the playback device further comprising program instructions stored on the at least one non-transitory computer-readable medium that are executable by the at least one processor such that the playback device is configured to:
after identifying the given wireless network, discontinue scanning for available wireless networks.

9. The playback device of claim 1, further comprising program instructions stored on the at least one non-transitory computer-readable medium that are executable by the at least one processor such that the playback device is configured to:
before identifying the given wireless network:
identify an unsecured wireless network; and
after identifying the unsecured wireless network, continue scanning for available wireless networks.

10. The playback device of claim 1, wherein:
the program instructions that are executable by the at least one processor such that the playback device is configured to begin initialization of the wireless network interface comprise program instructions that are executable by the at least one processor such that the playback device is configured to:
begin initialization of the wireless network interface based on receiving a command to play back audio content; and
the playback device further comprises program instructions stored on the at least one non-transitory computer-readable medium that are executable by the at least one processor such that the playback device is configured to:
based on the command to play back audio content, begin initialization of an application for retrieval and playback of audio content;
after beginning initialization of the application for retrieval and playback of audio content but before the playback device has obtained an internet protocol (IP) address:
determine that an initialization operation of the application for retrieval and playback of audio content requires an IP address; and
defer execution of the initialization operation that requires an IP address;
receive an indication that the playback device has obtained an IP address; and
based on the indication that the playback device has obtained the IP address, execute the initialization operation.

11. The playback device of claim 10, further comprising program instructions stored on the at least one non-transitory computer-readable medium that are executable by the at least one processor such that the playback device is configured to:
after executing the initialization operation, retrieve and play back given audio content.

12. The playback device of claim 10, wherein the program instructions that are executable by the at least one processor such that the playback device is configured to begin initialization of the application for retrieval and playback of audio content comprise program instructions that are executable by the at least one processor such that the playback device is configured to:
after establishing the connection to the given wireless network, begin initialization of the application for retrieval and playback of audio content.

13. The playback device of claim 10, wherein the initialization operation is a first initialization operation, the playback device further comprising program instructions stored on the at least one non-transitory computer-readable medium that are executable by the at least one processor such that the playback device is configured to:
determine that a second initialization operation requires an IP address;
assign a placeholder IP address for use by the second initialization operation;
execute the second initialization operation using the placeholder IP address; and
based on the indication that the playback device has obtained the IP address, update the placeholder IP address with the obtained IP address.

14. The playback device of claim 1, wherein the playback device is a portable playback device further comprising a rechargeable battery pack.

15. The playback device of claim 14, wherein the playback device is a wearable device.

16. A non-transitory computer-readable medium, wherein the non-transitory computer-readable medium is provisioned with program instructions that, when executed by at least one processor, cause a playback device to:
> begin initialization of a wireless network interface of the playback device;
> after beginning initialization of the wireless network interface but before the playback device is capable of establishing a connection to at least one wireless network type via the wireless network interface, cause the wireless network interface to scan for available wireless networks of the at least one wireless network type;
> identify at least one available wireless network of the at least one wireless network type; and
> after the playback device is capable of establishing a connection to the at least one wireless network type via the wireless network interface, use a stored indication of the at least one available wireless network to establish a connection to a given wireless network of the at least one available wireless network.

17. The non-transitory computer-readable medium of claim 16, wherein the non-transitory computer-readable medium is also provisioned with program instructions that, when executed by at least one processor, cause the playback device to:
> after identifying the at least one available wireless network, store a respective indication of each available wireless network,
>> wherein the program instructions that, when executed by at least one processor, cause the playback device to use the stored indication of the at least one available wireless network to establish the connection to the given wireless network comprise program instructions that, when executed by at least one processor, cause the playback device to:
>>> use the stored respective indication of the given wireless network to establish the connection to the given wireless network.

18. The non-transitory computer-readable medium of claim 16, wherein the program instructions that, when executed by at least one processor, cause the playback device to begin initialization of the wireless network interface comprise program instructions that, when executed by at least one processor, cause the playback device to:
> begin loading one or more software drivers for the wireless network interface.

19. A method carried out by a playback device, the method comprising:
> beginning initialization of a wireless network interface of the playback device;
> after beginning initialization of the wireless network interface but before the playback device is capable of establishing a connection to at least one wireless network type via the wireless network interface, causing the wireless network interface to scan for available wireless networks of the at least one wireless network type;
> identifying at least one available wireless network of the at least one wireless network type; and
> after the playback device is capable of establishing a connection to the at least one wireless network type via the wireless network interface, using a stored indication of the at least one available wireless network to establish a connection to a given wireless network of the at least one available wireless network.

20. The method of claim 19, further comprising:
> after identifying the at least one available wireless network, storing a respective indication of each available wireless network,
>> wherein using the stored indication of the at least one available wireless network to establish the connection to the given wireless network comprises:
>>> using the stored respective indication of the given wireless network to establish the connection to the given wireless network.

* * * * *